Figure 1:
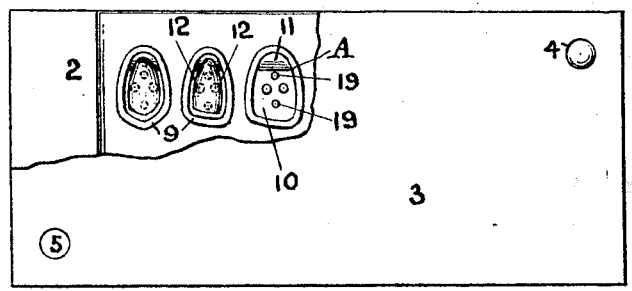

July 28, 1925.

E. F. WARFEL

MOLD FOR MOLDING ARTIFICIAL TOOTH STRUCTURES

Original Filed July 13, 1923

1,547,631

Inventor.
Edward Frank Warfel.

By

Attorney.

Patented July 28, 1925.

1,547,631

UNITED STATES PATENT OFFICE.

EDWARD FRANK WARFEL, OF PHILADELPHIA, PENNSYLVANIA, ASSIGNOR TO THE DENTISTS' SUPPLY COMPANY, A CORPORATION OF NEW YORK.

MOLD FOR MOLDING ARTIFICIAL-TOOTH STRUCTURES.

Application filed July 13, 1923, Serial No. 651,235. Renewed June 12, 1925.

*To all whom it may concern:*

Be it known that I, EDWARD FRANK WARFEL, a citizen of the United States, and resident of Philadelphia, county of Philadelphia, and State of Pennsylvania, have invented an Improvement in Molds for Molding Artificial-Tooth Structures, of which the following is a specification.

The object of my invention is to provide a construction of molds which shall be adapted for molding artificial teeth, as heretofore made, or for molding porcelain veneers representing the outer or face portions alone of the teeth, the molding cavities having removable mold blocks which, when in place, insure the molded structures having the veneer form, and when removed, insuring the molding of the teeth of the usual form, such as would be employed for vulcanite plate work.

My improved mold, therefore, has a double capacity and consequently, in the equipment of the factory where both of these types of porcelain tooth structures are required, only one-half the number of complete molds will be necessary, thereby insuring great economy in equipment.

In general construction, the two-part mold has each of its parts formed with molding cavities of such shape and form that when said parts are assembled, complete cavities are provided in the exact shape of the tooth structure to be produced, whether it be for frontal teeth or for the molars and bicuspids, and ordinarily, these molds are provided for receiving pins to be directly molded into the tooth structures produced or posts are employed for supporting anchors which are to be molded within the tooth body and to which subsequently pins are to be soldered in position. Such forms of molds are well known and are in common use.

My improvement comprehends the provision of removable mold blocks which are fitted to the mold spaces of that part of the mold structure as a whole which have the recesses corresponding to the back part of the tooth structure and these blocks are less than the width of the complete tooth structure and constitute forms which extend well into the space between the mold surfaces of the two parts of the mold structure, so that instead of there being a thick body of bisk material molded, only a relatively thin space is provided between the said mold blocks and the surfaces of the recesses in the other part of the mold structure in which the bisk may be received and molded, so that the ultimate tooth structure which is thus molded is in the form of a thin veneer, such as would constitute the buccal enamel surface of natural teeth.

My invention also consists of improvements hereinafter described whereby the above objects and results are attained, said improvements comprising certain organization and combination of parts which are fully described hereinafter and more particularly defined in the claims.

Figure 2:
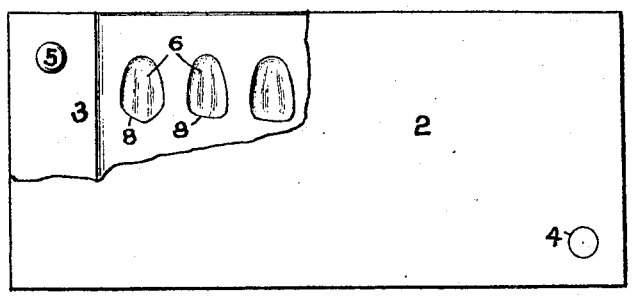
Figure 3:
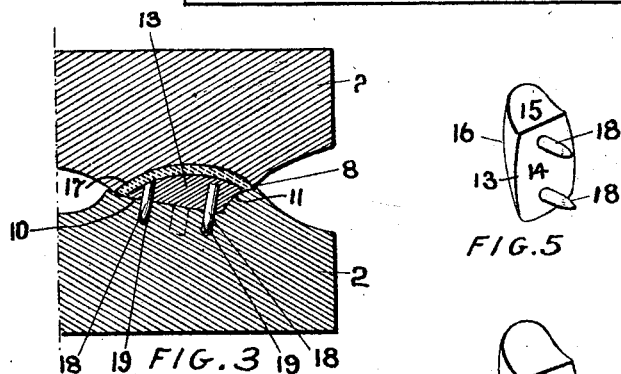
Figure 5:
Figure 6:
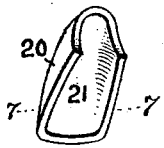
Figure 9:
Figure 7:
Figure 4:
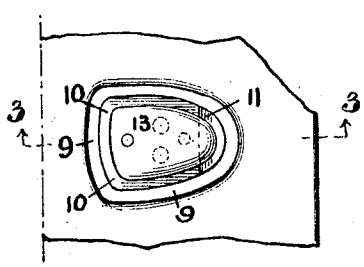
Figure 8:

Referring to the drawings: Fig. 1 is a plan view of the two-part mold with a portion of one part broken away to illustrate the molding parts of the other; Fig. 2 is a similar view of the mold inverted and the other part broken away to show the mold cavities for the buccal parts of the tooth structure; Fig. 3 is a transverse section taken on line 3—3 of Fig. 4; Fig. 4 is an enlarged plan view of one of the molding cavities shown in Fig. 1, with the mold block in place; Fig. 5 is a perspective view of one of the mold blocks removed; Fig. 6 is a perspective view of one of the porcelain veneers produced by the use of these improved molds; Fig. 7 is a transverse section of the same, taken on line 7—7; Fig. 8 is an elevation of the buccal side of a porcelain veneer for a molar tooth, also made by molds of the character of my improvement, and Fig. 9 illustrates a tooth form which may be molded from the same mold which embodies my improvements when the mold block shown in Fig. 5 is removed.

2 and 3 are the two parts of the mold, each of which is provided with a hole 4 and a pin 5, the hole in one part receiving the pin 5 of the other part to properly assemble said parts during the molding operation. In the case of the part 3, all of the molding cavities 6 have a configuration corresponding to the labial or buccal tooth surface, whereas the molding cavities 7 of the part 2 of the mold have their configuration corresponding to that which would constitute the back lingual portion of the tooth formed from the porcelain material which is molded in the tooth space formed by the bringing together of the two mold parts and their cavities 6 and 7. In practice, the bounding edges 8 of the cavities 6 are relatively sharp and closely fit the bounding edges 9 of the cavities 7 of the other part, these bounding edges 9 having a width sufficient to insure proper juncture of the sharper edges 8.

In practice, the surfaces 10 of the recesses or cavities 7 are substantially flat in the case of the frontal or anterior teeth, whereas surfaces 11, between the said flat portions 10 and the rim constituting the upper portion of the tooth structure, are made curved. Furthermore, in practice, where pins are to be provided for attaching the teeth to the vulcanite plate, said pins are either set in holes 12 in the flat portion 10 and molded into the bisk tooth, or the pins constitute anchor holding studs for molding such anchors in the body of the bisk and forming an entrance hole thereto into which the pins of the finished tooth are placed and soldered in position. All of this construction has heretofore been employed and, in general, will apply both to the frontal or anterior teeth illustrated in the present drawing and in respect to the molds for molding bicuspids and molars, but in the latter case, it is usual to omit pins and provide recesses therein at the lingual side to receive the vulcanite, to insure attachment in building up the denture.

For purposes of illustrating the present invention, I have deemed it sufficient to illustrate it in connection with the frontal or anterior teeth alone, as the only difference in applying my improvements to molds for making bicuspids and molars is that the cavities are modified in shape to correspond to those teeth.

It will be understood that if the molds are employed with no changes from the construction above described, tooth structures of substantially the form shown in Fig. 9 will be produced, but such structure would be those that have heretofore been made.

It is my purpose, however, to produce the veneer tooth forms shown in Figs. 6, 7 and 8, for example, Fig. 6 representing a veneer corresponding to the labial surface of a frontal tooth and Fig. 8 representing a corresponding surface of a molar, and these veneers are formed from the same two-part mold when the cavities 7 of part 2 of the mold are further provided with the mold blocks 13, which, in shape, correspond on the back portions 14 and 15 to the surface 10 and curved part 11 of the mold cavities or recesses of the mold part 2, whereas the other surface portion 15 of the block corresponds approximately to the shape of the cavity or recess 6 of the corresponding tooth in the mold part 3, but is of less size and surface so as to leave a space between the surface 16 and surface 6 when the mold parts are assembled, as indicated at 17 in Fig. 3.

To insure the mold blocks 13 being properly positioned in the recesses or cavities 7, said blocks are provided with pins 18 which are received in holes 19 in the surface 10 of the cavities or recesses, said holes 19 being so spaced as not to interfere with the holes 12 before referred to. The positions of these holes will readily be understood by reference to Figs. 3 and 4. For a better understanding of my invention, I have omitted the mold block 13 from one of the incisor teeth, as at A, in Fig. 1, so that the normal shape of the cavity or recess will be seen, but I have shown the mold blocks 13 in both the first and second laterals, to indicate the difference in the interior shapes of these cavities when said mold blocks are in position.

It will be understood that if desired, the pins 18 of the mold blocks 13 may be made to fit the holes 12 and thus only employ two holes instead of four, but it is preferable to employ separate holes, first, because it does not impair the accuracy of the holes 12 by the additional use of the mold blocks, but said holes 12 are so close together that they would not accurately insure proper positioning of the mold block 13 and I, therefore, prefer that the pins 19 shall be positioned as far apart longitudinally of the surface 10 as is conveniently possible, so that the position of said blocks are accurately insured and also permit stronger and larger pins to be employed than would be possible with the use of the holes 12.

When the blocks 13 are in position, as shown in Fig. 3, the bisk material is molded in the shape of the space 17 and will constitute thin veneer structures corresponding to the general shape of Figs. 6 and 7, having the usual lingual surfaces 20 and hollow back surfaces 21, and suitable for being cemented or otherwise attached in position over the lingual side of a tooth whose enamel has been removed. I do not limit myself as to the particular application of the veneer tooth structure produced, as it may be applied in any manner found convenient. Neither do I limit myself to having the back and front surfaces in exact conformity, as such features are matters of refinement rather than necessary to the embodiment of the invention.

When the bisk veneers are molded from the molds with my improved blocks 13 applied thereto, they are then dried and baked while held in position within the mold. Finally, they are vitrefied or "burned" in a muffle furnace. If the mold is to be used for artificial teeth, such as pin teeth, the mold blocks 13 are removed and the molding of the porcelain material into tooth form carried on in the usual manner. It is also evident, that as the molds are usually made to mold two sets of frontal teeth at one time, one set alone may be provided with mold blocks 13 and in this manner produce both the veneers or shells of Fig. 6 and the tooth structures of Fig. 9 at the same time.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:—

1. In a mold for making artificial teeth, the combination of two main mold parts each having recesses or cavities the cavities of one of the mold parts having a configuration corresponding to the back or lingual side of an artificial tooth and the surface configuration of the cavities or recesses of the other mold part corresponding to the labial or buccal part of an artificial tooth, and removable mold block portions detachably secured in the cavities or recesses corresponding to the back or lingual side of the tooth, the said blocks each having a surface in contact with the surface of the cavity or recess formed at and bounded by its greatest cross section and having rounded portions extending from the perimeter of said surface and projecting upwardly therefrom and approximating in shape the shape of the labial or buccal surface of the recess of the other mold part but having a less width and thickness than the mold space between the two parts so as to leave a relatively thin space between the rounded surface of said block and the inner surface configuration of the mold part whose recess corresponds to the labial or buccal portion of the tooth structure.

2. In a mold for making artificial teeth, the combination of the two main mold parts each having recesses or cavities, the cavities of one of the mold parts having a configuration corresponding to the back or lingual side of an artificial tooth and the surface configuration of the cavities or recesses of the other mold part corresponding to the labial or buccal part of the artificial tooth, and removable mold blocks detachably secured in the cavities or recesses corresponding to the back or lingual side of the tooth, the said blocks each having one surface made to snugly fit the surface of said recesses or cavities and the other surface projecting upwardly into the molding space but having a less width and thickness, so as to leave relatively thin spaces between said blocks and the inner surface configurations of the mold part whose recesses correspond to the labial or buccal portions of the tooth structure, and wherein further, the means for detachably securing the blocks in position upon one of the mold parts comprises a plurality of projecting pins arranged in a plane lying lengthwise of the block and holes in the bottom of the cavities or recesses of the mold part to which the blocks are attached.

3. The invention according to claim 2, wherein further, the cavities in which the mold blocks are detachably secured are further provided with two additional holes arranged in a plane transversely to the plane of the pins of the mold block and the holes in the cavities which they fit so that each cavity is provided with four holes arranged in pairs lying in planes at substantially right angles.

4. A removable mold block for a mold for molding artificial teeth, said block having its back formed of a shape which corresponds to the back or lingual surface of an artificial tooth produced by the mold and having the front surface substantially corresponding to the labial or buccal surface of the said artificial tooth though of less area so that the outward shape of the mold block corresponds to the outward shape of the artificial tooth but of a gross size slightly less than that of the tooth, and said mold block having pin structures for detachably positioning it in the molding recess of the mold.

5. In a mold for making artificial teeth, the combination of the two main mold parts each having recesses or cavities, the cavities of one of the mold parts having a configuration corresponding to the back or lingual side of the artificial tooth and the surface or configurations of the cavities or recesses of the other mold part corresponding to the labial or buccal part of the artificial tooth, and removable mold portions detachably fitted within the recesses or cavities of the mold part whose cavities correspond to the lingual side of the tooth structure to be molded, said removable mold portions projecting into the mold spaces formed by the cavities of the assembled mold parts and being of less width and thickness than the said spaces and providing between the surface configurations of the mold part corresponding to the lingual side of the tooth structure and the adjacent projecting parts of the removable mold portions a relatively shallow space whereby said shallow space is adapted for molding veneer shells of porcelain material conforming generally to the shape of the labial or buccal surface of the tooth structure.

6. In a mold for making artificial tooth forms, the combination of two mold parts each having tooth configurations and which when assembled provide a tooth form cavity of a shape approximating the labial or buccal surface of a tooth, the cavity in one mold part being curved inward with a configuration corresponding to the labial or buccal surface of a tooth and the other mold part having a mold surface providing a raised middle portion bounded by a narrow surrounding portion of relatively small width, the raised portion having a configuration approximating in surface shape the inwardly curved surface of the other mold part but of less area whereby there is provided between the molding surfaces of the two parts a space in which a shell or veneer of porcelain material corresponding to the labial or buccal surface of the tooth may be molded.

In testimony of which invention I hereunto set my hand.

EDWARD FRANK WARFEL.